United States Patent

[11] 3,610,585

[72] Inventors Douglas W. MacLeod
  Oxford;
  Walter A. Rapetski, Orange; Jerome P. Rothschild, Orange; Richard B. Barnes, Bethany, all of Conn.
[21] Appl. No. 20,596
[22] Filed Mar. 18, 1970
[45] Patented Oct. 5, 1971
[73] Assignee USM Corporation
  Boston, Mass.

[54] MIXER
  8 Claims, 8 Drawing Figs.
[52] U.S. Cl. ............................................. 259/6
[51] Int. Cl. .............................................. B01f 7/02
[50] Field of Search .......................... 259/6, 7, 9, 10, 104, 109, 110, 41, 21; 220/36

[56] References Cited
UNITED STATES PATENTS

| | | | |
|---|---|---|---|
| 2,495,242 | 1/1950 | Jones.......................... | 259/6 |
| 2,962,186 | 11/1960 | Gottschalk ................. | 220/36 X |
| 3,099,040 | 7/1963 | Matsuoka.................... | 259/6 X |
| 3,155,056 | 11/1964 | Smith ......................... | 259/6 X |
| 3,490,750 | 1/1970 | Brennan ...................... | 259/6 |

Primary Examiner—Robert W. Jenkins
Attorney—Delio and Montgomery

ABSTRACT: A mixing device having spaced-apart end frames and side assemblies defining an internal mixing chamber which slide into the end frames to define a mixing chamber. One piece end plates carried by the end frames and retained by the side assemblies further define the mixing chamber.

PATENTED OCT 5 1971

INVENTORS
Douglas W. MacLeod
Walter A. Rapetski
Jerome P. Rothschild
Richard B. Barnes BY De Lio and Montgomery
ATTORNEYS INVENTORS
Douglas W. MacLeod
Walter A. Rapetski
Jerome P. Rothschild
Richard B. Barnes
BY De Lio and Montgomery
ATTORNEYS

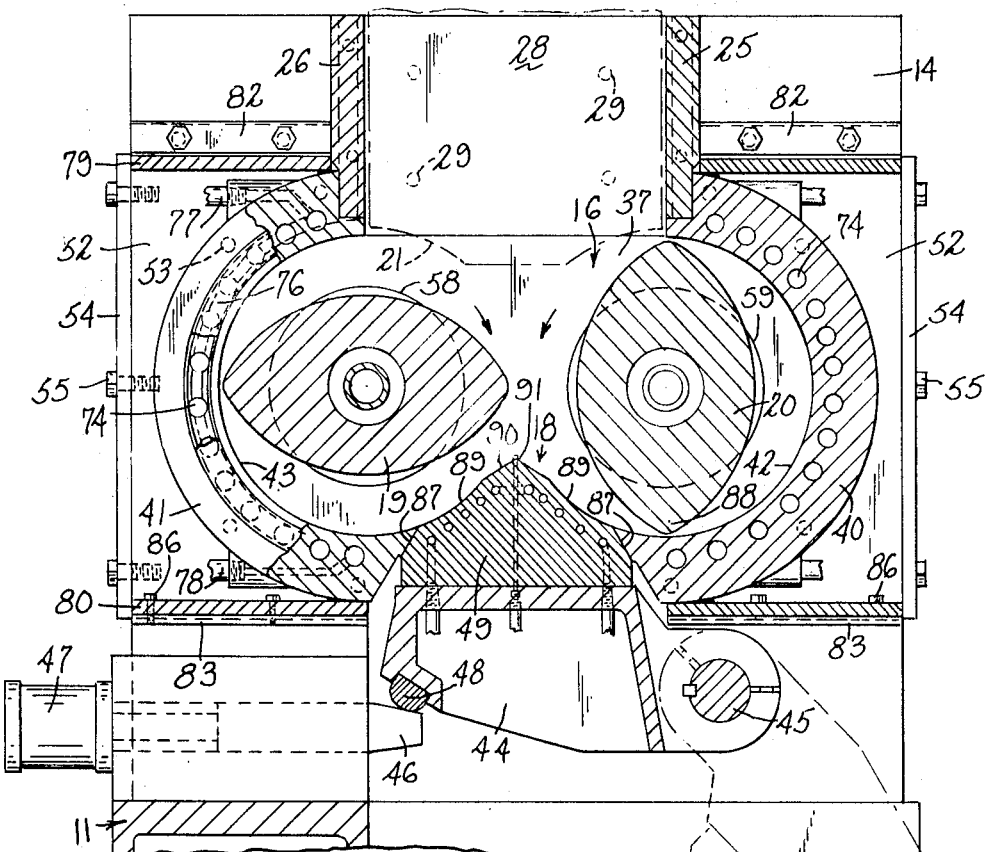
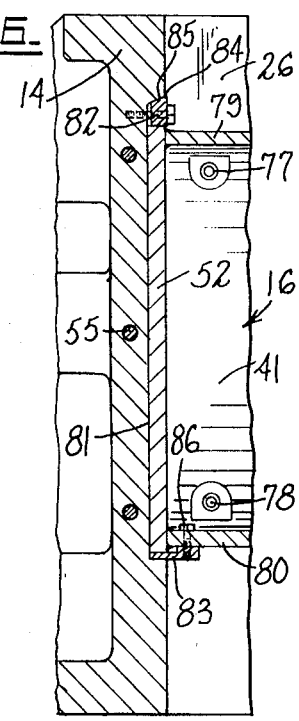
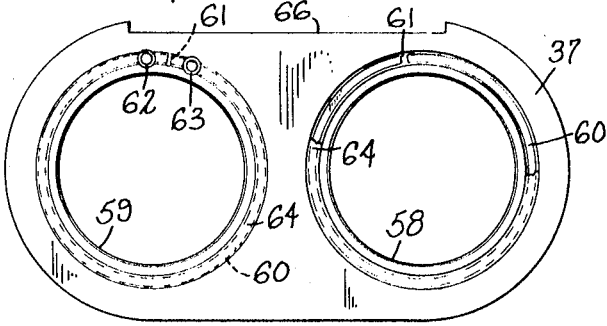

MIXER

This invention relates to mixing devices of the type having an internal mixing chamber wherein material is mixed into a plastic state by bladed rotors.

Such devices generally comprise a chamber into which material is fed through an upper vertical passage. Within the chamber are bladed rotors mounted to rotate within the chamber and knead the material. The chamber is provided with a lower discharge opening through which the material is discharged after it has been mixed, and this opening is closed by a discharge door movably mounted to the frame of the machine. A mixer of the general type to which this invention pertains is shown in U.S. Pat. No. 2,962,186 to C. F. Gottschalk.

The mixing chamber is generally defined as a pair of adjacent cylinders which may be overlapping with the axis of the rotors disposed centrally of each cylinder. The rotors act upon material such as rubber or other plastic which is mixed into a plastic mass and then discharged through the bottom door.

Such machines generally comprise a housing having two large rotor shafts with blades thereon which turn in opposite directions to knead the material in the chamber. The walls defining the mixing chamber are generally cylindrical in internal configuration with a small amount of clearance between the blades on the rotors.

As such, the parts of the machine are subjected to considerable stress due to the counter rotation of the two rotor shafts and the kneading action the rotors and blades thereof produce on the material being worked. Sometimes a temporary overload situation occurs in which substantial torque is transmitted to the mixing chamber end plates through which the rotors pass, tending to separate the same.

In many instances, the material is worked in the chamber under considerable pressure, and may initially consist of powders or other finely divided material which may have a tendency to escape from the chamber if there is any opportunity. Therefore, it is desirable that the mixing chamber be adequately sealed. From time to time, the chamber must be cleaned of residue and wearable parts must be replaced. It is therefore desirable that the apparatus be so constructed that it may be readily disassembled and reassembled.

Accordingly, this invention provides a new and improved construction for a mixing device of the type described which is easy to assemble, dismantle and reassemble and which provides new and improved construction for those parts which are subject to wear from the mixing action.

An object of this invention is to provide a new and improved construction for a device of the type described.

Another object of this invention is to provide a new and improved construction of a mixing chamber for a device of the type described.

A still further object of this invention is to provide a new and improved functional relationship of parts which will readily allow assembly, disassembly of the device and interchange and ready replacement of worn parts.

A still further object of this invention is to provide new and improved mixing chamber sealing means for the rotors of devices of the type described.

The features of the invention which are believed to be novel are particularly set forth and distinctly claimed in the concluding portion of this specification. However, the invention both as to its organization and operation, together with further objects and advantages thereof, may be best appreciated by reference to the following detailed description taken in conjunction with the drawings, wherein:

FIG. 4 is a view seen in the plane of lines 4—4 of FIG. 1;

FIG. 6 is a view seen in the plane of lines 6—6 of FIG. 5;

FIG. 7 is a view of an end plate which defines the mixing chamber; and

Figure 1:
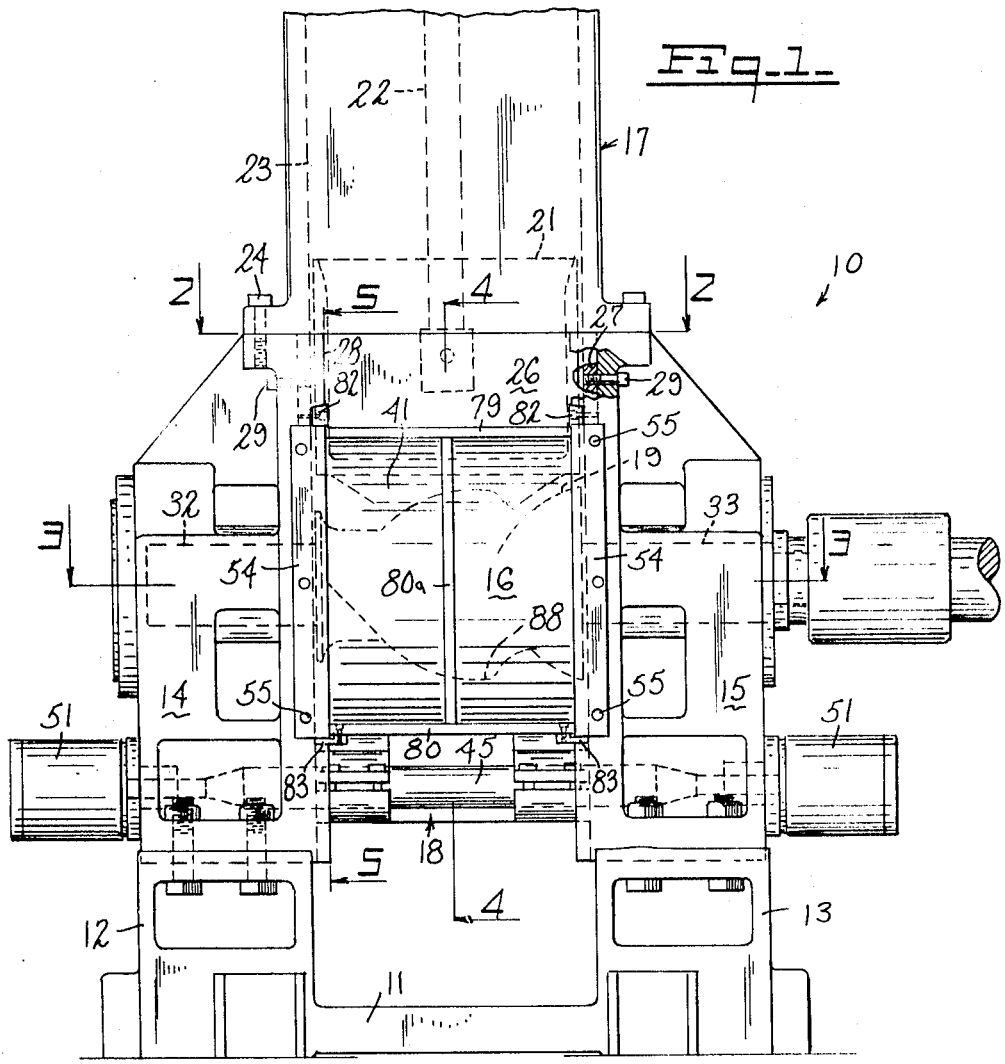
FIG. 1 is a side elevation of a machine of the type described embodying the invention.

A mixing device 10 in which the invention is embodied comprises a base 11 having pedestal portions 12 and 13 which support end frame members 14 and 15, respectively.

As will hereinafter be more fully described, machine 10 defines a mixing chamber 16 which receives material in unfinished form through a chute or hopper 17 which defines a passage to the mixing chamber. Upon completion of the mixing of the material it is discharged through a lower opening which is closed by a door 18 into a container (not shown) in the space therebelow. Shown within chamber 16 in dotted line are the mixing rotors 19 and 20.

Extending downwardly in hopper 17 is a weight or plunger 21 carried on a rod or piston shaft 22 which may be hydraulically or pneumatically operated to force the material to be mixed down through hopper 17 into mixing chamber 16. An arrangement which may be utilized herein for actuating the weight 21 is shown in U.S. Pat. No. 2,985,909 to G. W. Smith et al.

Figure 2:
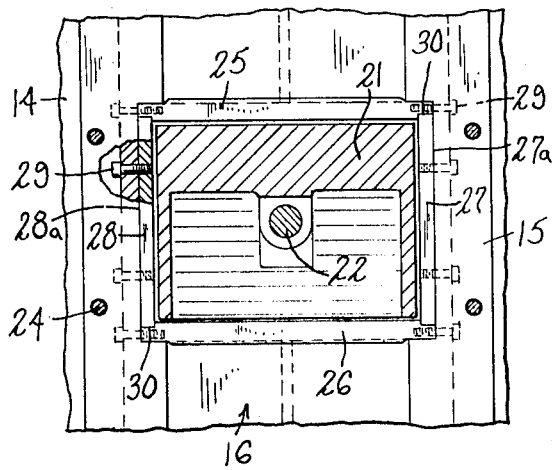
FIG. 2 is a view seen in the plane of lines 2—2 of FIG. 1.

The hopper 17 is defined by a channellike member 23 which is affixed to end frames 14 and 15 as by means of bolts 24. Towards the lower portion of hopper 17 the entrance into the mixing chamber is defined by opposed pairs of wear plates 25, 26; and 27, 28 which are secured to end frames 14 and 15 as by means of bolts 29 as more clearly shown in FIG. 2. Wear plates 25 and 26 have shoulders 30 defined in the end portions thereof to matingly receive the edges of wear plates 27 and 28.

The sides of the hopper may be subjected to substantial wear due to sideway movement of weight 21 during the mixing action during rotation of the rotors 19 and 20. Rotors 19 and 20 produce a violent mixing action and will transmit substantial force in the lateral direction as well as in the vertical. This will cause the sides of weight 21 to strike and abrade the walls defining hopper 17 when at the lower portion thereof.

Figure 3:
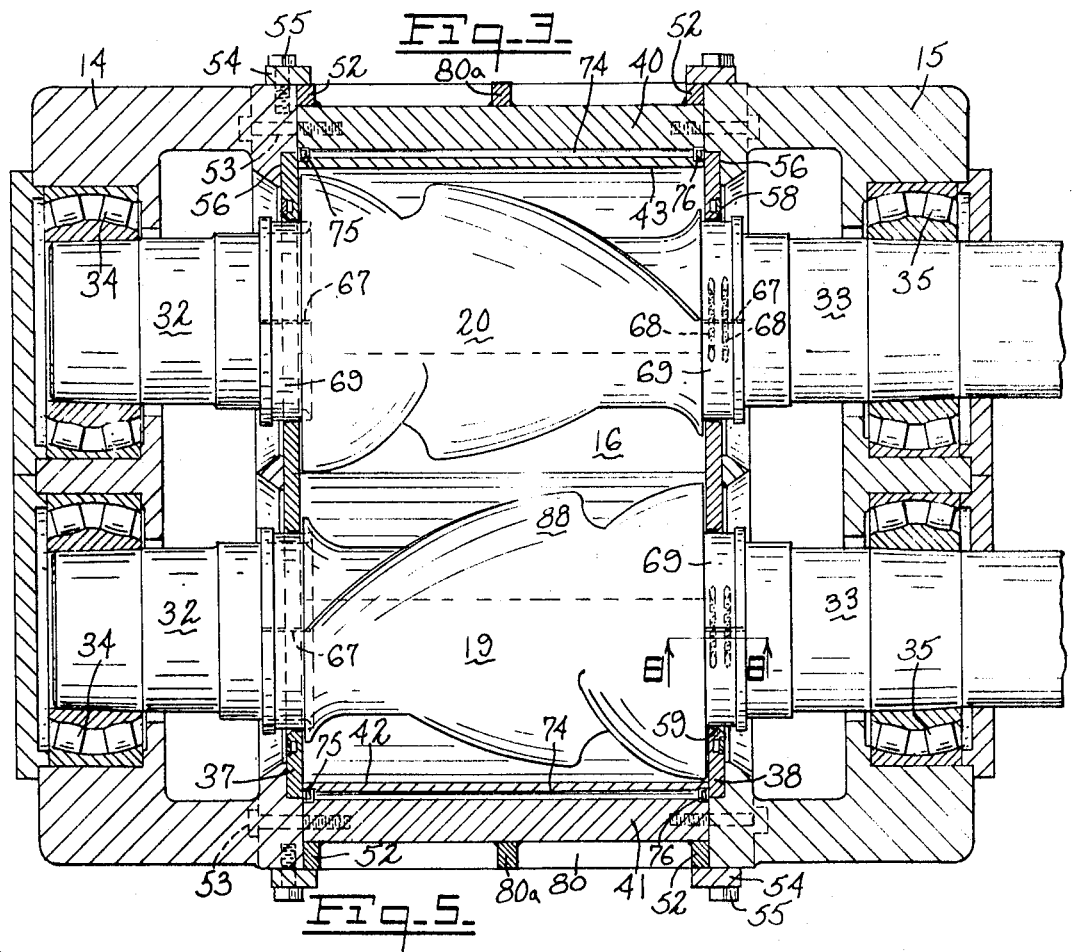
FIG. 3 is a view seen in the plane of lines 3—3 of FIG. 1.

As more clearly shown in FIG. 3, the journals 32 and 33 of each of rotors 19 and 20 are rotatably supported in self-centering bearing assemblies 34 and 35 carried in end frames 14 and 15, respectively. The rotors further extend through end plates 37 and 38 which define opposite ends of the mixing chamber 16 as will hereinafter be described.

As more clearly shown in FIG. 4, the cylindrical sidewalls of mixing chamber 16 are defined by side assemblies which include members 40 and 41 having inner surfaces 42 and 43, respectively, defined on a cylinder. The door assembly 18 comprises a support 44 mounted on a shaft 45. A plunger 46 which may be hydraulically or pneumatically operated by a cylinder 47 is adapted to engage an abutment or lug 48 on its tapered end surface and urge the door assembly 18 into sealing engagement with the edges of members 40 and 41, respectively. A closure member 49, more fully described hereinafter, is carried on support 44. Support 44 and door 18 thereon are adapted to be swung counterclockwise as viewed in FIG. 4 to permit the contents of the mixing chamber to be dropped through the bottom opening. Such motion is provided by actuators 51 (FIG. 1) which drive shaft 45. Actuators 51 may be any suitable drive means, but hydraulic motors are preferable.

Figure 5:
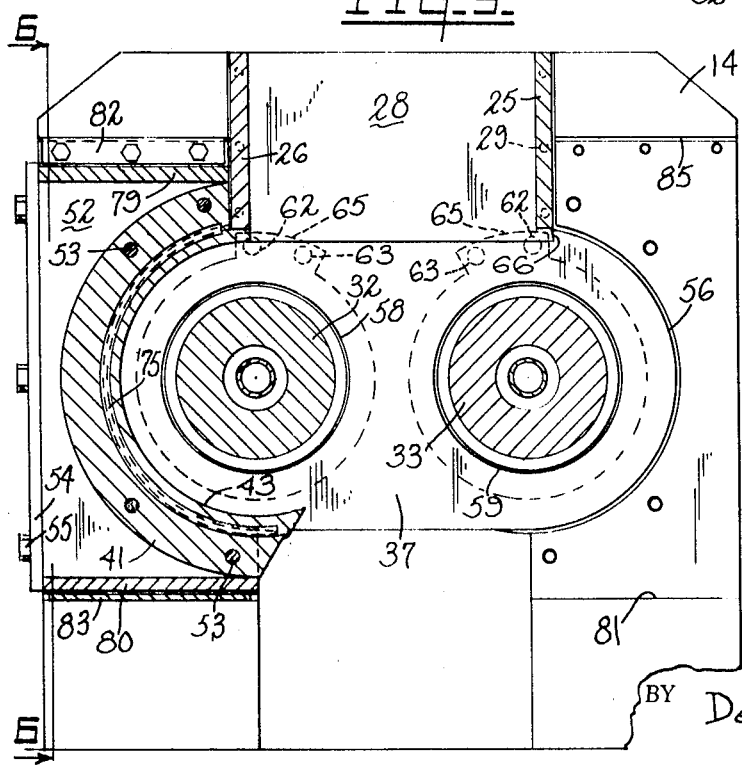
FIG. 5 is a view seen in the plane of lines 5—5 of FIG. 1.

As more clearly shown in FIG. 5, the chamber defining members 40 and 41 have integral flange members 52 at either end thereof which are secured to end frames 14 and 15 as by means of bolts 53 and are further retained in place by means of an overlapping locking bar or stop member 54 bolted to end frames 14 and 15 as by means of bolts 55 and bearing on the edges of flanges 52.

The end plates 37 and 38 are received in complimentary recesses 56 (FIG. 3) defined in end frames 14 and 15, and are exemplified by the end plate 37 shown in FIG. 7. Each of the end plates is defined in one piece with circular openings 58 and 59 therethrough adapted to receive the shaft of the rotors therethrough. Further defined about each opening is an annular passage 60 which is interrupted and blocked at 61. Connections for cooling liquid ingress and egress are provided at 62 and 63. The passages 60 are closed as shown at 64 (FIG. 8) except for the connection openings 62 and 63 which are accessible through an opening 65 in the end frames. Each of the end plates also has a recess 66 defined in the top thereof adapted to seat one of wear plates 27 and 28 therein.

Figure 8:
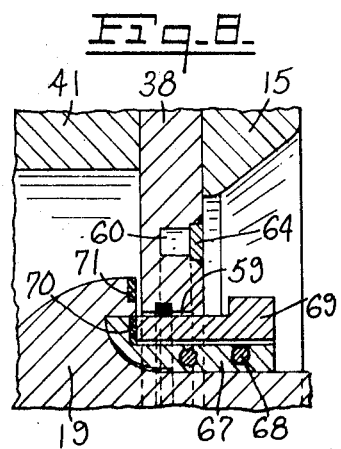
FIG. 8 is a view seen in the plane of lines 8—8 of FIG. 3.

As further shown in FIG. 8, disposed about the shaft of each rotor where it passes through the end plates is a split bearing member 67 adapted to receive bolts 68 tangentially therethrough at the split for tightening of the bearing about the shaft of the rotor. A cooperating stationary sleeve member 69 is fitted into openings 58 and 59 in end plate 37 and is stationary with respect thereto. Members 67 and 69 provide a seal about the shaft of rotor 19 and to this end may include sealing member 70 and a sealing member 71 mounted to a blade of rotor 19.

The chamber defining members 40 and 41 have a plurality of cooling fluid passages 74 running longitudinally therethrough. The passages are closed at the ends by pieces 75 and 76, and connected in a serpentine arrangement (not shown). Ingress and egress connections are made at 77 and 78. Extending between the flange members 52 on either side of the apparatus are upper and lower plate members 79 and 80 (FIG. 1) with a rib member 80a therebetween. Plate members 77 and 78 are rigidly secured to flange members 52 and each of the chamber defining members 40 and 41 as by means of welding. This provides a rigid boxlike construction. This construction additionally facilitates removal and replacement of an entire side section of the mixer.

A side section assembly which comprises one of the chambers 40 or 41, flanges 52, plates 77 and 78, and rib 79, slides into horizontally directed recesses 81 in end frames 14 and 15, as exemplified in FIG. 6. Disposed above and below the edges of flanges 52 in recesses 81 are upper and lower spacing members 82 and 83, bolted to an end frame and lower plate 80, respectively.

Member 82 has an upper inclined surface 84 contacting a complimentary inclined surface 85 of the end frame to provide a wedging action to rigidly lock the flanges 52 in recesses 81.

As seen more clearly in FIG. 4, the wear plates 25 and 26 are seated on shoulders provided therefor on members 40 and 41, but are not fastened thereto. The wear plates 27 and 28 are seated in the recesses 66 in end plates 37 and 38. The wear plates 25, 26, 27 and 28 form a rigid boxlike chute, which is secured to the end frames by means of bolts 29, FIG. 2. The recesses 56 for the end plates are defined within the recesses 81 which receive the flanges 52 of the side assemblies. The recesses 56 are also coplanar with the recesses or grooves 27a and 28a (FIG. 2) which receive plates 27 and 28 extending downwardly from hopper 17.

As shown in FIG. 4, the internal walls 42 and 43 of the chamber defining members 40 and 41, respectively, subtend angles greater than 180°. This presents a problem in removing the side assemblies, dependent upon the position of the bladed rotors. Therefore, the spacing members 82 and 83 and, more specifically, spacing member 83 is provided to facilitate removal and replacement of the side assemblies when it is desired to remove the side assemblies. The bolts 86 securing bottom spacing member 83 to plate 80 are removed and the members 83 slide outwardly from recesses 81. Then the side assembly retaining bolts 53 and the bolts 55, together with straps 54 are removed. The side assemblies may be dropped the dimension of member 83 so that the lower margin portion 87 (FIG. 4) of members 40 and 41 will have clearance to be moved outwardly past the blades of the rotors as exemplified by blade 88, FIG. 4. The surfaces 89 of the door closure member 49 define a continuation of the cylindrical surfaces 42 and 43 and merge into surfaces 90 on closure member 49. The surfaces 90 are inclined upwardly to a line or apex 91.

The inclined surfaces 90 help insure that there will be no deposit of unmixed material on a flat surface of the closure member 49 to thus aid in more complete mixing of the material. This construction further allows the dimensions and, hence, the mass of door assembly 49 to be made smaller by extending the surfaces 42 and 43. This construction thus reduces the power requirements for rotating shaft 45 and operating the door assembly.

The disclosed construction provides a very rigid mixing apparatus but facilitates disassembly and reassembly of parts while providing a tight seal for the mixing chamber.

It may thus be seen that the objects of the invention set forth as well as those made apparent from the preceding description are efficiently attained. Inasmuch as other embodiments of the invention may occur to others skilled in the art, the appended claims are intended to cover all modifications of the disclosed embodiments of the invention as well as other embodiments thereof which do not depart from the spirit and scope of the invention.

What is claimed is:

1. A mixing device of the type described having spaced apart end frame members, and sidewall means internally defining a mixing chamber in the form of adjacent cylinders with mixing rotors supported by said end frame members extending through the mixing chambers; comprising a pair of side assemblies, each of said side assemblies having wall means defining a portion of the surface of a cylinder and including flange members at opposite ends thereof, said flange members having upper and lower substantially parallel edge surfaces, a horizontally directed recess defined in each end frame arranged to receive the edge surfaces of said flange members therein so that said side assemblies may be slid horizontally onto and out of said end frames, said side assemblies defining a bottom doorway for discharge of material from said chamber and an upper opening for introduction of material into said chamber.

2. A mixing device according to claim 1 further comprising, a pair of end plates, a further recess defined in each of said end frames arranged to receive said end plates therein, each of said end plates having openings therethrough for said rotors, the ends of said side assemblies engaging said end plates and holding said end plates in said further recesses.

3. A mixing device according to claim 2 wherein a cooling liquid channel is defined in said end plates about each of said openings, means in said channel interrupting the continuity thereof, and ingress and egress openings to the channel defined in said end plates on opposite sides of said interrupting means.

4. A mixing device according to claim 2 further including cooperative sealing means carried by said end plates about the openings therein and the shafts of said rotors.

5. A mixing device according to claim 1 further including spacing members positionable on the lower surfaces of said recess arranged to elevate said side assemblies, and means securing said spacer members to said side assemblies whereby said spacer members may be removed to permit lowering of said side assemblies in said recesses prior to removal of said side assemblies from said end frames.

6. A mixing device according to claim 1 further comprising a feed hopper secured to said end frames and defining a passage to said upper opening, two pairs of opposed plate members secured together to define a channel between said passage and said mixing chamber, said wall members having shoulders defined thereon longitudinally thereof to receive and seat one pair of said plate members therein.

7. A mixing device of the type described having spaced apart end frame members, and sidewall means internally defining a mixing chamber in the form of adjacent cylinders with mixing rotors supported by said end frame members extending through the mixing chambers comprising, a pair of side assemblies, each of said side assemblies having wall means defining a portion of the surface of a cylinder and including flange members at opposite ends thereof, said flange members having upper and lower substantially parallel edge surfaces, a horizontally directed recess defined in each end frame arranged to receive the edge surfaces of said flange members therein so that said side assemblies may be slid horizontally onto said end frames, a further recess defined in each of said end frames, a pair of end plates, said end plates being received in said further recesses such that the surfaces thereof are essentially flush with the vertical surfaces of said end frames in said recess, the ends of said wall means bearing on a portion of said end plates and retaining said end plates in said further recesses, said side assemblies defining an upper opening for introduction of material into said chamber, a feed hopper secured to said end frames and defining a passage to said upper opening, two pairs of opposed plate members secured together to define a channel between said hopper and said upper opening, said wall means and said end plates having seats defined thereon to receive and seat said plate members.

8. A mixing device of the type described having spaced apart end frame members, and sidewall means internally defining a mixing chamber in the form of overlapping cylinders with mixing rotors supported by said end frame members extending through the mixing chamber comprising, a pair of side assemblies, each of said side assemblies having wall means defining a portion of the surface of a cylinder and including flange members at opposite ends thereof, said flange members having upper and lower substantially parallel edge surfaces, a horizontally directed recess defined in each end frame arranged to receive the edge surfaces of said flange members therein so that said side assemblies may be slid horizontally onto said end frames, said side assemblies defining a bottom doorway extending longitudinally of said chamber for discharge of material from said chamber, a door pivotally mounted to said end frames and arranged to extend into and close said bottom opening, said door having surfaces defining a continuation of the cylindrical walls of said mixing chamber and merging into an apex within said chamber extending longitudinally thereof.